United States Patent Office 2,926,093
Patented Feb. 23, 1960

2,926,093

STABILIZATION OF ORGANIC SUBSTANCES

Henryk A. Cyba, Chicago, Ill., assignor, by mesne assignments, to Universal Oil Products Company, Des Plaines, Ill., a corporation of Delaware No Drawing. Application August 12, 1957
Serial No. 677,800

13 Claims. (Cl. 99—163)

This invention relates to the stabilization of organic substances which normally tend to deteriorate in storage or in use due to oxidation or other reactions.

The invention is particularly applicable to the stabilization of lubricants including greases and lubricating oils. These may be either of synthetic or petroleum origin. The synthetic greases generally are referred to as lithium base grease, sodium base grease, calcium base grease, barium base grease, strontium base grease, aluminum base grease, etc. These greases are solid or semisolid gels and, in general, are prepared by the addition to mineral or synthetic oils of hydrocarbon-soluble metal soaps or salts of higher fatty acids as, for example, lithium stearate, calcium stearate, aluminum naphthenate, etc. The grease may contain thickening agents such as silica, carbon black, polyacrylates, talc, etc. Another type of grease is prepared from oxidized petroleum wax, to which the saponifiable base is combined with the proper amount of the desired saponifying agent, and the resultant mixture processed to produce a grease. Other types of greases in which the features of the present invention are usable include petroleum grease, whale grease, wool grease, etc., and those made from inedible fats, tallow, butcher's waste, etc.

The synthetic lubricating oils are of various types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol di-pelargonate, 1,5-pentanediol-di-(2-ethylhexanonate), etc. The polyalkaline oxides and derivatives include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. The highly fluorinated hydrocarbons include fluorinated oil, perfluorohydrocarbons, etc.

The present invention also is particularly applicable to the stabilization of polymers. Reference to polymers in the present application includes polyolefins, rubber, etc. The polyolefins preferably are of high molecular weight, usually having a molecular weight above 1000 and extending into the hundreds of thousand range. Generally, these are synthetically prepared. A typical example is the widely used polyethylene plastics. Other polyolefins include polypropenes, polybutenes and polymers of higher molecular weight olefins. These may be of the high density, medium density, or low density type. Polyethylene is utilized, for example, as thermoplastic molding or coating agent. Because of its high dielectric strength and its resistance to water, polyethylene is particularly advantageous for use as insulators or dielectrics in condensers and other similar electronic equipment. However, polyethylene is subject to attack by atmospheric oxygen, particularly at elevated temperatures, either in use or during manufacture, and this impairs the desirable properties thereof including, for example, a reduction in the desirable electric properties, gellation upon oxidation, etc.

Included in the reference to polymers is rubber which also may be considered as a polyolefin. For example, GR-S rubber is a polymer or condensation product of butadiene (a polyolefin) and styrene (having an ethylene group and could be named phenylethylene). The rubbers may be natural or synthetic. Other illustrative synthetic rubbers include butyl rubber, nitrile rubber, neoprene rubber, etc. It is understood that the novel features of the present invention can be used with any rubber which is subjected to deterioration by air or oxygen.

The present invention also is particularly applicable to the stabilization of fatty materials including the stabilization of edible fats and oils, which may be of animal, vegetable or mineral origin and which tend to become rancid especially during long periods of storage prior to use. Typical representatives of edible fats and oils include linseed oil, menhaden oil, cod liver oil, castor oil, olive oil, rapeseed oil, coconut oil, palm oil, corn oil, sesame oil, peanut oil, butter, fat, lard, beef tallow, etc. It is understood that other oils and fats may be treated within the scope of the present invention, including oils and fats which previously have been subjected to various treatments, such as blowing with air, heat treatment, hydrogenation, etc.

In another embodiment the present invention may be applied to the treatment of crops by dusting or spraying in order to preserve food accessory factors such as carotene, vitamins, various fatty acids, alcohols, etc.

Other organic substances which deteriorate in storage, during treatment, and/or in use, include hydrocarbons, and particularly motor fuels such as unsaturated gasoline, blends of unsaturated and saturated gasolines, etc., as well as jet fuel, diesel oil, mineral oil, fuel oil, drying oil, waxes, resins, etc. These substances are adversely affected by oxygen, with the resultant formation of undesirable gum, discoloration and/or other deleterious reaction products.

In one embodiment the present invention relates to a method of stabilizing an organic substance normally subject to oxidative deterioration which comprises incorporating therein a stabilizing concentration of an aminophenyl alkoxyphenyl ether inhibitor.

In a specific embodiment, the present invention relates to a method of stabilizing synthetic grease which comprises incorporating therein from about 0.1% to about 5% by weight of 4-methoxyphenyl-2'-aminophenyl ether.

In another specific embodiment, the present invention relates to a method of stabilizing polyethylene against oxidative deterioration which comprises incorporating therein a stabilizing concentration of 4-methoxyphenyl-4'-N-isopropyl-aminophenyl ether.

In still another specific embodiment, the present invention relates to a method for stabilizing lard against rancidity which comprises incorporating therein a stabilizing concentration of an alkoxyphenyl aminophenyl ether inhibitor.

Any suitable alkoxyphenyl aminophenyl ether may be used in accordance with the present invention. In a preferred embodiment, the alkoxy and amino groups are in a relation 4,4'-, 2,4'-, or 4,2'- to the ether linkage and thus the alkoxy and amino groups are positioned on different phenyl rings. The alkoxy groups preferably contain from one to six carbon atoms and thus are selected from methoxy, ethoxy, propoxy, butoxy, pentoxy and hexoxy groups, although in some cases higher molecular weight alkoxy groups may be employed, although not necessarily with equivalent results. In another embodiment two or more alkoxy groups may be positioned on the same ring, two such alkoxy groups being preferred.

The amino group may comprise an amino group ($NH_2$) or an N-hydrocarbon substituted amino group. In general, the hydrocarbon substituent attached to the nitrogen atom will contain not more than about 12 carbon atoms and preferably is of branched chain configuration and still more particularly a secondary group. Illustrative secondary groups include N-isopropyl, N-sec-butyl, N-sec-amyl, N-sec-hexyl, N-sec-heptyl, N-sec-octyl, N-sec-nonyl, N-sec-decyl, N-sec-undecyl, N-sec-dodecyl, etc. In another embodiment the hydrocarbon substituent attached to the nitrogen atom may comprise a cycloalkyl group, including N-cyclopentyl, N-cyclohexyl, etc., the latter also containing alkyl substituents attached to the ring thereto when desired. It is understood that two or more amino or N-substituted amino groups may be included, preferably positioned on the same phenyl ring. In another embodiment, both of the hydrogen atoms attached to the nitrogen atom may be substituted with hydrocarbon groups, the hydrocarbon groups preferably being selected from those hereinbefore set forth.

It is understood that one or both of the phenyl rings also may contain hydrocarbon substituents attached directly to the nucleus, these substituents preferably being alkyl groups including methyl, ethyl, propyl, butyl, amyl, hexyl, heptyl, octyl, etc. Generally, such nuclear hydrocarbon groups will be in a position ortho or para to the ether linkage, depending upon the positions of the alkoxy or amino substitutions thereon. In another embodiment, the nucleus may contain non-hydrocarbon substituents, these containing oxygen, nitrogen, sulfur or halogen. A preferred non-hydrocarbon substituent comprises chlorine. Illustrative compounds of this type include 4-methoxy-2-chlorophenyl-4'-aminophenyl ether, 2-methoxy-4-chlorophenyl-4'-aminophenyl ether, 4-methoxy-2,6-dichlorophenyl-4'-aminophenyl ether, etc. However, it is understood that the chloro- or other non-hydrocarbon substituted compounds are used only in substrates in which the presence of the non-hydrocarbon substituent is not objectionable.

Illustrative preferred aminophenyl alkoxyphenyl ethers include the following: 4-methoxyphenyl-4'-aminophenyl ether, 4-methoxyphenyl-4'-N-methyl-aminophenyl ether, 4-methoxyphenyl-4'-N-ethyl-aminophenyl ether, 4-methoxyphenyl-4'-N-isopropyl-aminophenyl ether, 4-methoxyphenyl -4'- N - sec - butyl-aminophenyl ether, 4-methoxyphenyl-4'-N - sec - amyl - aminophenyl ether, 4 - methoxyphenyl-4'-cyclohexyl-aminophenyl ether, etc., 4-methoxyphenyl -2'- aminophenyl ether, 4-methoxyphenyl -2'- N-methyl-aminophenyl ether, 4-methoxyphenyl-2'-N-ethyl-aminophenyl ether, 4 - methoxyphenyl - 2' - N - isopropyl-aminophenyl ether, 4-methoxyphenyl - 2' - N - sec - butyl-aminophenyl ether, 4-methoxyphenyl - 2' - N - sec - amyl-aminophenyl, 4-methoxyphenyl-2'-N-cyclohexyl-aminophenyl ether, etc., 2-methoxyphenyl-4'-aminophenyl ether, 2 - methoxyphenyl - 4' - N - methyl - aminophenyl lether, 2-methoxyphenyl-4'-N-ethyl-amino-phenyl ether, 2-methoxyphenyl-4'-N-isopropyl-aminophenyl ether, 2-methoxyphenyl-4'-N-sec-butyl-aminophenyl ether, 2-methoxyphenyl-4'-N-sec-amyl-aminophenyl ether, 2-methoxyphenyl-4'-N-cyclohexyl aminophenyl ether, etc.

Illustrative compounds containing two alkoxy groups include 2,6-dimethoxyphenyl-4'-aminophenyl ether, 2,4-dimethoxyphenyl-4'-aminophenyl ether, 3,4-dimethoxyphenyl-4'-aminophenyl ether, 2,4-dimethoxyphenyl-2'-aminophenyl ether, 3,4-dimethoxyphenyl-2'-aminophenyl ether etc., and similar compounds in which a hydrocarbon substituent is attached to the nitrogen atom, the hydrocarbon substituent preferably being selected from those hereinbefore set forth. Illustrative examples containing hydrocarbon substituents attached directly to the nucleus of one or both of the phenyl rings include 2-methoxy-4-methylphenyl-4'-aminophenyl ether, 4-methoxy-2-methylphenyl-4'-aminophenyl ether, 2,6-dimethoxy-4-methylphenyl-4'-aminophenyl ether, 2-methyl-4-methoxyphenyl-2'-aminophenyl ether, 2-methyl-4,6-dimethoxyphenyl-2'-aminophenyl ether, etc. It is understood that other hydrocarbon groups and particularly those hereinbefore set forth may be substituted for the methyl group and also that the nitrogen atom may contain a hydrocarbon constituent attached thereto, the latter substituent preferably being selected from those hereinbefore set forth.

From the above description, it will be noted that a number of different inhibitor compounds may be used in accordance with the present invention. However, it is understood that the different compounds are not necessarily of equivalent potency. The specific compound to be used will depend upon the availability and/or cost of preparation and also upon the effectiveness in the particular organic substance to be stabilized. It is understood that a mixture of compounds may be employed, the particular compounds in the mixture preferably being selected from those hereinbefore specifically set forth. In some cases, a mixture of isomers is produced during the manufacture of the inhibitor and, when desired, the mixture is used as such, thereby avoiding the additional time and expense of separating the components of the mixture.

In general, the inhibitor will be utilized in a concentration of from about 0.001% to about 5% by weight of the organic substance, although in some cases higher or lower concentrations may be employed. The exact concentration to be used will depend upon the particular organic substance being treated. In most cases concentrations of from about 0.01% to about 3% by weight generally will be employed.

It is understood that the inhibitor may be used along with other additives incorporated in the organic substance. For example, in grease the inhibitor may be used along with higher alcohols, esters, organic amines, polybutene, sulfurized fatty materials, sulfur chlorine compounds, dyes, perfumed materials, fillers, etc. In some cases, it may be of advantage to also include a metal deactivator as, for example, disalicylal diamino propane, ethylene diamine tetra-acetic acid tetra-sodium salt, etc., or to include other additives such as tricresyl phosphate, trialkyl phenols including 2,6-di-tert-butyl-4-methylphenol, 2,4-di-methyl-6-tert-butylphenol, alkylated diphenyl amines, phenyl naphthyl amines, dialkyl phenylene diamines, phenothiazine, organic selenium compounds, etc., as well as corrosion inhibitors, extreme pressure additives, viscosity index improvers, etc. When desired, the inhibitor of the present invention may be prepared as a mixture with one or more of these other additives and incorporated in this manner in the organic substance or components thereof.

The inhibitor of the present invention may be incorporated in the organic substance in any suitable manner and at any suitable stage of preparation. For example, in an organic substance which comprises a mixture of several components, as, for example, grease, the inhibitor may be added to one or more of the components of the grease prior to compositing and processing thereof or it may be added to the mix at any time, preferably before final processing in order to obtain intimate mixing and dissolving of the inhibitor in the grease.

The following examples are introduced to illustrate further the novelty and utility of the present invention but not with the intention of unduly limiting the same.

Example I 4-methoxyphenyl-2'-aminophenyl ether was utilized as inhibitor in a lithium grease. The grease was prepared by mixing 91% of highly refined lubricating oil with 8% of lithium stearate. The mixture was heated at about 450° F. while agitating the same. Subsequently, the grease was cooled while agitating to 320° F. and, at this temperature, 0.5% by weight of 4-methoxyphenyl-2'-aminophenyl ether was added. Agitation was continued and the mixture was allowed to cool to about 250° F. and the grease then further cooled slowly to room temperature.

The 4-methoxy-2'-aminodiphenyl ether inhibitor was prepared as follows: p-methoxyphenol was reacted with potassium hydroxide dissolved in ethyl alcohol. o-Nitrochlorobenzene was commingled with the solution and the mixture stirred and heated to 205° C. for five hours. Excess o-nitrochlorobenzene was removed by steam distillation, and the product was crystallized from hexane solvent. 4-methoxyphenyl-2'-nitrophenyl ether was recovered as slightly yellowish needles having a melting point of 74.5–75.5° C. The 4-methoxyphenyl-2-nitrophenyl ether was dissolved in benzene and reduced in the presence of a platinum-containing catalyst at a temperature of 140° C. and a hydrogen pressure of 108 atmospheres. 18 atmospheres of hydrogen were absorbed after 7 hours. The catalyst was removed by filtering and the solvent was removed by distillation. The product was a white oily liquid having a boiling point of about 130° C. at 0.2 mm.

The stability of the grease was tested according to a modified Norma-Hoffmann method, in which a sample of the grease was placed in a bomb and oxygen was charged thereto. The bomb then was heated to 212° F. and the time required for a drop of five pounds pressure was taken as the induction period. However, the inhibitors of the present invention were very effective in retarding deterioration that the run was stopped before a five pound drop in pressure was reached and, in such cases, the actual pressure drop at that time is reported.

A control sample of the grease (not containing this additive) had an induction period of 9.5 hours to reach five pounds drop in pressure. On the other hand, the sample of the grease containing 0.5% by weight of 4-methoxyphenyl-2'-aminophenyl ether underwent a one pound pressure drop in more than 284 hours and the run was, accordingly, discontinued. Thus, it will be noted that the inhibitor of the present invention was exceptionally effective in improving the stability of the grease.

Example II

The inhibitor used in this example is 4-methoxyphenyl-4'-aminophenyl ether. It was prepared in substantially the same manner as described in Example I, except that p-nitrochlorohexane was reacted with p-methoxyphenol. After reduction and separation, the final product consisted of white needles having a melting point of 73°–75° C.

When evaluated in another sample of the grease and in the same manner as described in Example I, the sample of grease containing 0.5% by weight of 4-methoxyphenyl-4'-aminophenyl ether reached a one pound drop in pressure after 168 hours. Here again, it will be noted that the inhibitor of the present invention was very effective in improving the stability of the grease.

Example III

The inhibitor used in this example is 4-methoxyphenyl-4'-N-octyl-aminophenyl ether. This inhibitor was prepared in substantially the same manner as described in Examples I and II, except that the 4-methoxyphenyl-4'-aminophenyl ether was reductively alkylated with methylhexyl ketone at 100° C. in the presence of a platinum catalyst. After separation, the product was a white oily liquid, having a boiling point of 191°–193° C. at 0.25 mm.

When evaluated in another sample of the grease and in the same manner as described in Example I, the sample of grease containing 0.5% by weight of 4-methoxyphenyl-4'-N-octyl-aminophenyl ether reached a pressure drop of 1.5 pounds after more than 168 hours. Here again, it will be noted that the inhibitor was very effective in improving the stability of the grease.

Example IV

The inhibitor of this example was 2-methoxyphenyl-4'-N-cyclohexyl-aminophenyl ether. This inhibitor was a low melting pale-yellow solid and had a boiling point of 134.5–135.5° C. at 0.25–0.3 mm.

When this inhibitor was evaluated in another sample of the grease described in Example I and in the same manner as described therein, a sample of the grease containing 0.5% by weight of 2-methoxyphenyl-4'-N-cyclohexyl-aminophenyl ether developed a pressure drop of two pounds in more than 168 hours. It is apparent that this inhibitor was very effective in stabilizing the grease.

Example V

The inhibitor of this example was 2,6-dimethoxyphenyl-4'-N-isopropylaminophenyl ether. This inhibitor was prepared by reacting 2,6-dimethoxyphenol with potassium hydroxide in ethyl alcohol. 2,6-dimethoxy potassium phenolate precipitated out of the solution. The 2,6-dimethoxy potassium phenolate was mixed with p-nitrochlorobenzene and heated for six hours at 200° C. while stirring. Excess p-nitrochlorobenzene was removed by steam distillation, and the remaining product was crystallized from aqueous acetic acid. 2,6-dimethoxyphenol-4'-nitrophenyl ether was recovered as crystalline amber-yellow solid having a melting point of 98°–99° C. The 2,6-dimethoxyphenyl-4'-nitrophenyl ether was reductively alkylated with acetone in the presence of a platinum-containing catalyst at 160° C. and a hydrogen pressure of 100 atmospheres. The product was separated from the catalyst by filtering and from the excess acetone by evaporating the latter. 2,6-dimethoxyphenyl-4'-isopropylaminophenyl ether was recovered as an amber solid melting at 93–96° C. and having a boiling point of 174°–176° C. at 0.75–1 mm.

When evaluated in another sample of the grease and in the manner described in Example I, a sample of the grease containing 0.5% by weight of 2,6-dimethoxyphenyl-4'-N-isopropylaminophenyl ether developed a pressure drop of 0.5 pound in more than 168 hours. Here again, it will be noted that the inhibitor of the present invention was very effective in improving the stability of the grease.

Example VI

The grease used in this example was prepared in the same manner as described in Example I, except that a different refined lubricating oil was used. A control sample (not containing an inhibitor) of the grease, when evaluated in the manner described in Example I, with exception that a brass catalyst was added to make the conditions more severe, developed a five pound pressure drop in 12 hours. Another sample of this grease containing 0.5% by weight of 2-methoxyphenyl-4'-N-isopropylaminophenyl ether, in the presence of brass catalyst did not reach this induction period until 190 hours. Considerable improvement of the stability of the grease was obtained with this inhibitor.

Example VII

The inhibitor of this example is 4-methoxyphenyl-4'-N-isopropylaminophenyl ether and was used in the stabilization of lard. The lard had a normal stability of 6 hours, as determined by the Swift test. This test is described in detail in the article by A. E. King, H. L, Roschen and W. H. Irwin, which appeared in Oil and Soap, vol. X, No. 6, pages 105–109 (1933), and modified as described in the article by R. W. Reimenschneider, J. Turner and R. M. Spec, which appeared in Oil and Soap, pages 169–171 (September 1943). In general, this test comprises bubbling air through a sample of the lard and determining rancidity organoleptically and by peroxide number. The results of these tests are reported as A.O.M. stability period, which is the number of hours required to reach a peroxide number of 20.

0.02% by weight of 4-methoxyphenyl-4'-N-isopropyl-aminophenyl ether served to increase the A.O.M. stability period of the lard from 6 hours to 37.5 hours.

*Example VIII*

This example illustrates the use of an inhibitor of the present invention in polyethylene plastic. The polyethylene used in this example is of the Ziegler type, high density, and marketed under the trade name of "Hi-Fax" by Hercules Powder Company. The effect of the inhibitor was determined by spreading the inhibitor evenly over the surface of a five gram sheet of uninhibited polyethylene, covering the first sheet with another five gram uninhibited sheet, pressing the sheets together at a temperature of 140° C. and a pressure of 10,000 p.s.i. These sheets then are cut into strips of about ⅛" x ⅛" and one gram weighing of the strips are pressed again at a temperature of 140°–150° C. and a pressure of 15,000 p.s.i. The average thickness of the sheets thus prepared is about 5 mils. One gram sheets then are placed in a bomb and exposed to 100 pounds of oxygen at 100° C. The sheets are examined periodically by infrared and the rate of increase of the carbonyl band at 1715 cm.$^{-1}$ is determined. Intensity value of 40 is taken as the induction period because decomposition is appreciably increased beyond this value.

The inhibitor used in this example is 4-methoxyphenyl-4'-N-isopropylaminophenyl ether. It was incorporated in the polyethylene in a concentration of 0.07% by weight. A sample of polyethylene containing this inhibitor did not reach the induction period until after about 1400 hours. On the other hand, a control sample (not containing the inhibitor) of the polyethylene reached a carbonyl intensity value of 674 in 72 hours. The control sample had a very bad odor and was brittle.

*Example IX*

The inhibitor used in this example is 2-methoxyphenyl-4'-N-isopropylaminophenyl ether. It was evaluated in the same manner as described in Example VIII, except that 0.2% by weight of inhibitor was employed. A sample of the polyethylene containing this inhibitor had a carbonyl intensity value of 19 after 1175 hours. As stated in Example VIII, a control sample of the polyethylene had a carbonyl intensity value of 674 after 72 hours. It thus is seen that this inhibitor served to considerably improve the stability of the polyethylene.

*Example X*

The inhibitor of this example was 4-methoxyphenyl-4'-N-octyl-aminophenyl ether. 0.2% by weight of this inhibitor was incorporated in another sample of the polyethylene and this sample was evaluated in the manner described in Example VIII. After 1056 hours, a carbonyl intensity of 40 was reached. Thus, this inhibitor served to considerably improve the stability of the polyethylene.

I claim as my invention:

1. A method of stabilizing an organic substance normally subject to oxidative deterioration and selected from the group consisting of lubricants, hydrocarbon oils and polymers, and fatty materials which comprises incorporating therein a stabilizing concentration of an aminophenyl alkoxyphenyl ether inhibitor.

2. A method of stabilizing an organic substance normally subject to oxidative deterioration and selected from the group consisting of lubricants, hydrocarbon oils and polymers, and fatty materials which comprises incorporating therein a stabilizing concentration of a 4-aminophenyl-4'-alkoxyphenyl ether inhibitor.

3. A method of stabilizing an organic substance normally subject to oxidative deterioration and selected from the group consisting of lubricants, hydrocarbon oils and polymers, and fatty materials which comprises incorporating therein a stabilizing concentration of a 2-aminophenyl-4'-alkoxyphenyl ether inhibitor.

4. A method of stabilizing an organic substance normally subject to oxidative deterioration and selected from the group consisting of lubricants, hydrocarbon oils and polymers, and fatty materials which comprises incorporating therein a stabilizing concentration of a 4-aminophenyl-2'-alkoxyphenyl ether inhibitor.

5. An organic material normally subject to oxidative deterioration and selected from the group consisting of lubricants, hydrocarbon oils and polymers, and fatty materials containing, as an inhibitor against said deterioration, a stabilizing concentration of an aminophenyl alkoxyphenyl ether inhibitor.

6. Grease normally subject to oxidative deterioration containing, as an inhibitor against said deterioration, a stabilizing concentration of an aminophenyl alkoxyphenyl ether inhibitor.

7. Synthetic grease normally subject to oxidative deterioration containing, as an inhibitor against said deterioration, a stabilizing concentration of 4-methoxyphenyl-2'-aminophenyl ether.

8. Lubricating oil normally subject to oxidative deterioration containing, as an inhibitor against said deterioration, a stabilizing concentration of an aminophenyl alkoxyphenyl inhibitor.

9. Polyolefin normally subject to oxidative deterioration containing, as an inhibitor against said deterioration, a stabilizing concentration of an aminophenyl alkoxyphenyl ether inhibitor.

10. Polyethylene normally subject to oxidative deterioration containing, as an inhibitor against said deterioration, a stabilizing concentration of 4-methoxyphenyl-4'-N-isopropyl aminophenyl ether.

11. Rubber normally subject to oxidative deterioration containing, as an inhibitor against said deterioration, a stabilizing concentration of an aminophenyl alkoxyphenyl ether inhibitor.

12. Fatty material normally subject to oxidative deterioration containing, as an inhibitor against said deterioration, a stabilizing concentration of an aminophenyl alkoxyphenyl ether inhibitor.

13. Lard normally subject to oxidative deterioration containing, as an inhibitor against said deterioration, a stabilizing concentration of 4-methoxyphenyl-4'-N-isopropylaminophenyl ether.

References Cited in the file of this patent

UNITED STATES PATENTS

| | | |
|---|---|---|
| 1,703,915 | Zitscher | Mar. 5, 1929 |
| 1,987,321 | Calcott | Jan. 8, 1935 |
| 2,048,362 | Stoesser | July 21, 1936 |

UNITED STATES PATENT OFFICE
CERTIFICATE OF CORRECTION

Patent No. 2,926,093                                February 23, 1960

Henryk A. Cyba

It is hereby certified that error appears in the printed specification of the above numbered patent requiring correction and that the said Letters Patent should read as corrected below.

Column 8, line 41, before "inhibitor" insert -- ether --.

Signed and sealed this 10th day of January 1961.

(SEAL)
Attest:

KARL H. AXLINE                                        ROBERT C. WATSON
Attesting Officer                                     Commissioner of Patents

UNITED STATES PATENT OFFICE

CERTIFICATE OF CORRECTION

Patent No. 2,926,093                  February 23, 1960

Henryk A. Cyba

It is hereby certified that error appears in the printed specification of the above numbered patent requiring correction and that the said Letters Patent should read as corrected below.

Column 8, line 41, before "inhibitor" insert -- ether --.

Signed and sealed this 10th day of January 1961.

(SEAL)
Attest:

KARL H. AXLINE                               ROBERT C. WATSON
Attesting Officer                           Commissioner of Patents